Figure 1:
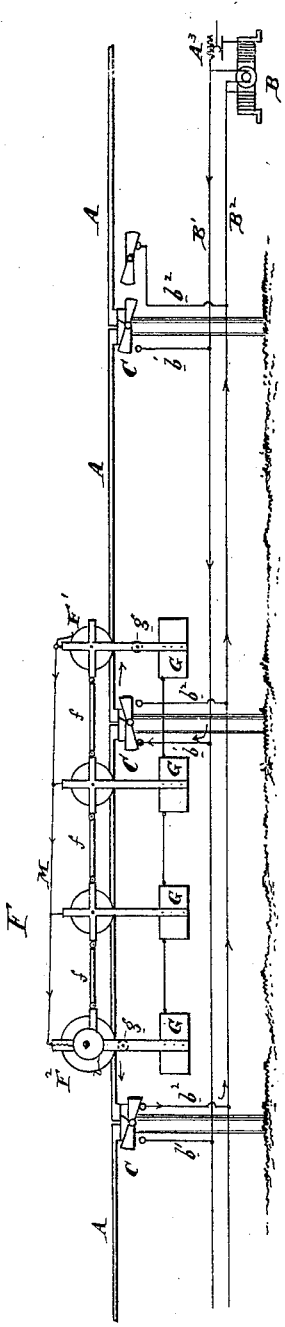

(No Model.) 2 Sheets—Sheet 1.

R. M. HUNTER.
ELECTRIC RAILWAY.

No. 428,098. Patented May 20, 1890.

Attest

Inventor (No Model.) 2 Sheets—Sheet 2.

R. M. HUNTER.
ELECTRIC RAILWAY.

No. 428,098. Patented May 20, 1890.

Attest:
Henry Drury

Inventor:

UNITED STATES PATENT OFFICE.

RUDOLPH M. HUNTER, OF PHILADELPHIA, PENNSYLVANIA, ASSIGNOR, BY MESNE ASSIGNMENTS, TO THE THOMSON-HOUSTON ELECTRIC COMPANY, OF BOSTON, MASSACHUSETTS.

ELECTRIC RAILWAY.

SPECIFICATION forming part of Letters Patent No. 428,098, dated May 20, 1890.

Original application filed May 22, 1886, Serial No. 202,950. Divided and this application filed January 14, 1888. Serial No. 260,699.

(No model.)

*To all whom it may concern:*

Be it known that I, RUDOLPH M. HUNTER, of the city and county of Philadelphia, and State of Pennsylvania, have invented an Improvement in Electric Railways, of which the following is a specification.

My invention has reference to electric railways; and it consists in certain improvements, all of which are fully set forth in the following specification, and shown in the accompanying drawings, which form part thereof.

There are two generic systems of electric railways, one in which the car or motor is controlled by an operator and is adapted for passenger transportation, and the other of which is for merchandise transportation and is self-regulating. This latter system, when cables or elevated rails are used, is technically called "telpherage," and it is to such system that my invention has more particular reference. The essential feature of this system is that the motors or trains are made to travel over or parallel to a conductor which is automatically broken at successive points within range of the length of the train, so that the current is brought up from the line through the motor and led back again to the line, whereby all the motors or trains are working in series with each other and receive their electric energy from a common source.

While I show and describe the railway as formed of taut wires, cables, or rails in an elevated position upon posts, it is to be understood that the same system is applicable to surface roads and with operators to control the trains or cars.

In carrying out my invention I stretch cables between posts or supports—say one hundred feet apart—and these sections are electrically coupled by suitable switch devices, either mechanical or electrical, and adapted to be automatically actuated by the passing train or motors. A current of electricity is made to flow upon said sections of conductor and by them is conveyed to the motor or motors on the train. The electricity is preferably supplied to all the sections from one source or generating-station. The trains may be made up of several cars propelled by a single motor, or each car may have a motor, and said trains or motors should be of a length equal to or greater than the distance between two switches. The forward end of the train automatically opens one switch, while the rear end of the train closes the next switch in the rear. By this means there will only be one switch open at one time, and this switch will make a break in the line. The current is led up from the rear end of the train through the electric motor to the forward end and again to line beyond the break. If the distance between the switches is small, then a single car may be made to operate the switches. This, however, would be more suitable in surface roads, and the particular means for accomplishing that result forms subject-matter of another application. The train in a telpherage system is without any one to control it; hence it must be made self-regulating. I therefore provide the motor of said train with suitable automatic regulating devices.

This application is a division of that filed May 22, 1886, Serial No. 202,950, and is designed to cover the specific constructions of railway as embodied in the claims appended, the original application being more particularly for the means of regulating or controlling the travel of the motor.

Figure 2:
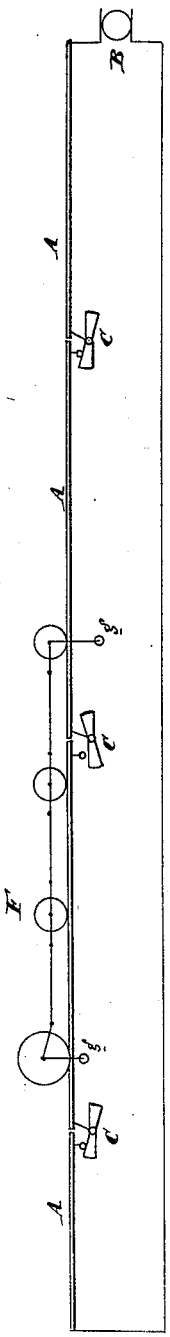
Figure 5:
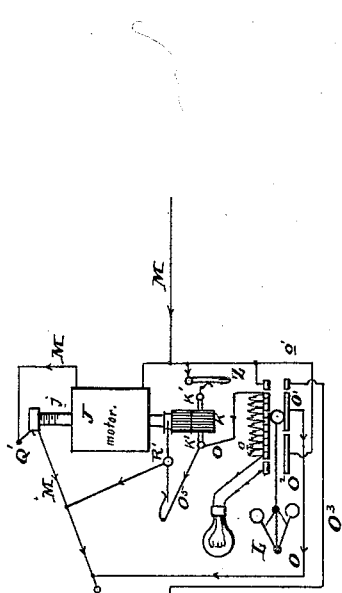
Figure 6:
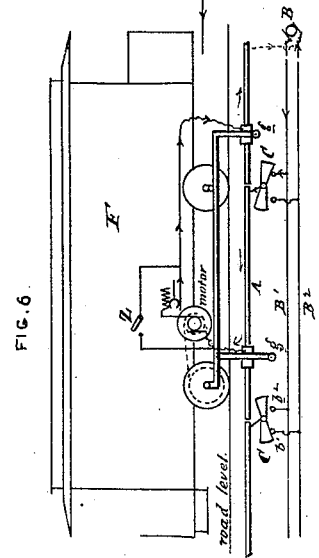
Figure 3:
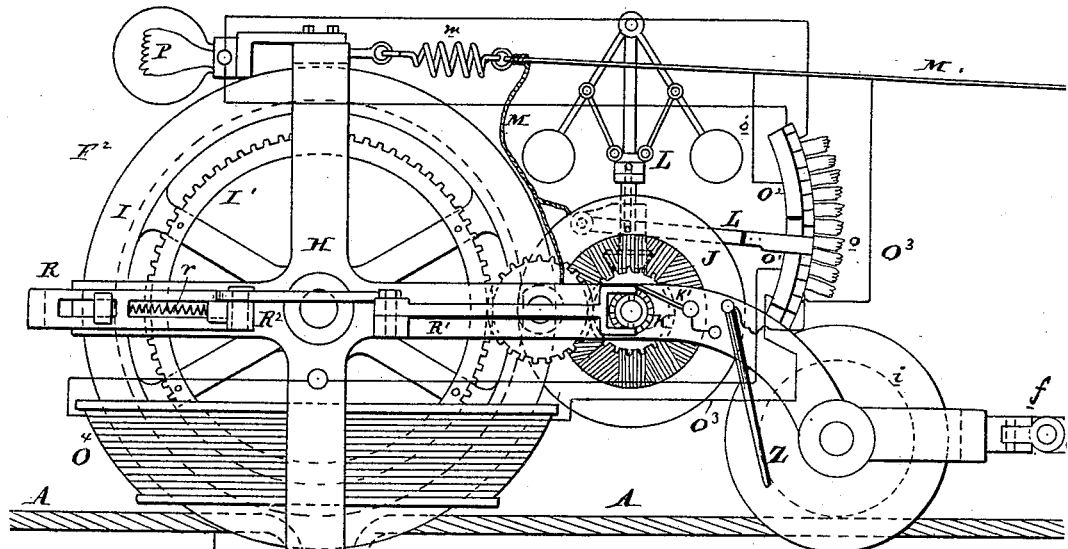
Figure 3:
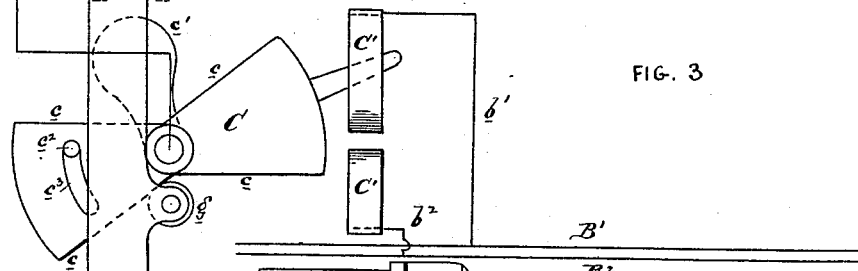
Figure 4:
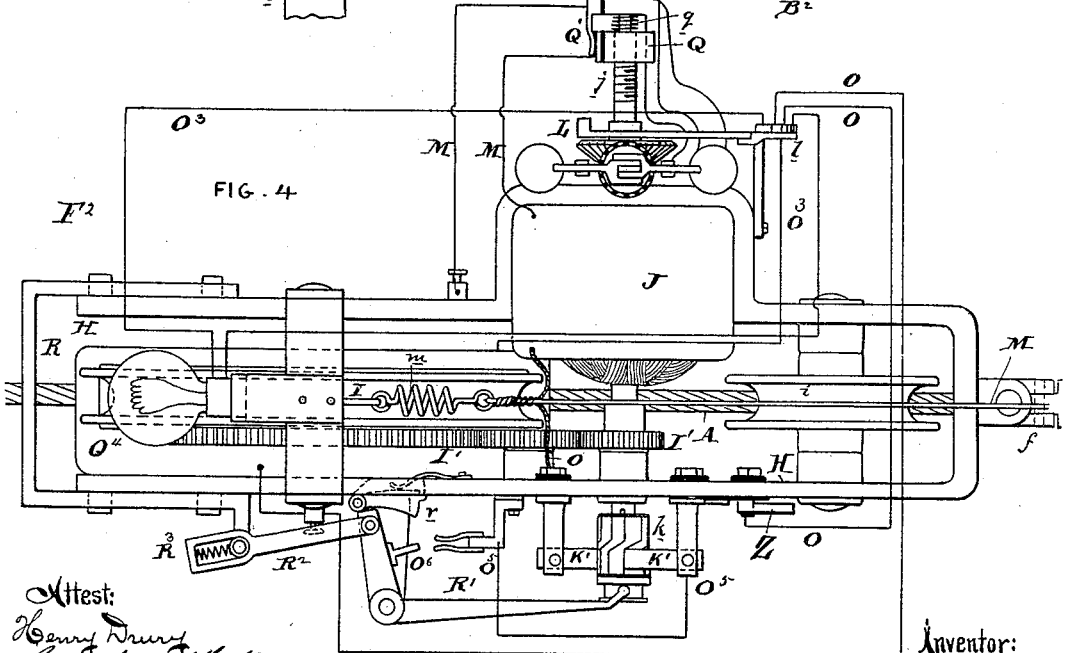

In the drawings, Figure 1 is a diagram showing my improved electric-railway system. Fig. 2 shows a modification of same. Fig. 3 is a side elevation of a traction-motor embodying my invention. Fig. 4 is a plan view of same. Fig. 5 is a diagram illustrating the circuits on the motor. Fig. 6 is an elevation showing my system applied to surface roads.

Where the line-conductor is to support the train, (see Fig. 2,) it acts as the working-conductor and supplies current directly to the motor, the switches simply bridging the breaks between the sections and are controlled by the train passing them. The train is equal to or greater than the distance apart of these switches, and when the forward part of the train opens one switch the rear part closes another, so as to make the current continue to travel through the motor or the train. There is considerable objection to this, as the bare cables are exposed, and as the current is constantly passing over them there must of necessity be leakage and abnormal resistances due to imperfect contact, which when duplicated are greatly magnified.

In the system shown in Fig. 1 the current is fed to line-wires $B'$ $B^2$, which are continuous and which may be embedded or properly supported and insulated above ground. It is evident that conductors $B^2 b^2$ might be earth-circuits, if desired. From these wires the current is fed by branches $b'$ $b^2$ to the working-sections A, the switches C controlling the connection of the sections A with the conductors $B'$ or $B^2$. The working of this system is evident upon examining Fig. 1. It will be noticed that only two sections A are coupled up in series while the train is in contact with them and all others are out of circuit and no current is passing over them.

The switches C have cam-faces $c$ $c$, (see Fig. 3,) whereby they are adapted to be shifted by the passing train. The roller or pin $g$ on the forward motor or car or part of a car or train opens the switch as the car or train runs upon each new section, and the roller or pin $g$ on the last motor, car, or part of car or train (see Fig. 1) closes the switch as it leaves the section. The switch-lever C is combined with a weight $c'$, which is shifted to one or the other side of the fulcrum of the switch or its own pivot-point and holds the switch open or closed or in shifted position after being shifted by the passing train or motor. This acts as a lock whereby friction is not relied upon to hold the switch in its extreme positions. In addition to this function, the weight assists in shifting the switch-lever, so as to make it operate quickly. The movements of the switch are limited by a pin $c^2$ on the supporting-frame working in a slot $c^3$ on the switch, or vice versa. In place of single switches C, double switches may be used, as shown at one place in Fig. 1.

$F^2$ is the motor-car. H is its frame, in which the main traction-wheel I and the trail or guide wheel $i$ are mounted. J is the electric motor and is carried by said frame H and is geared at $I'$ with the main wheel I.

K is the commutator and has an auxiliary part $k$, in which the sections are advanced sufficiently for reversing the motor. This commutator is movable longitudinally upon the armature-shaft, so that the part $k$ may be moved into working position with the brushes $K'$, if desired. The various cars are connected by couplings $f$, which may have universal joints, as shown in Figs. 4 and 3, to admit of the long train turning corners and following quick changes in altitude. The current is brought from the rear car by wire M to the motor. Here it divides, part of the current going through the field-magnet circuit M to frame H and wheel I to line, and part to the armature-circuit frame H and wheel I to line. Of course it is evident that the armature might be coupled up in series with the field-magnets in place of multiple-arc connection, as is set out in Letters Patent No. 405,668, June 18, 1889, granted to me.

L is an ordinary centrifugal or speed governor and is connected either directly or indirectly with the armature-shaft of the motor; hence its speed is dependent upon the speed of the armature, and consequently the motor as an entirety. This governor moves a contact-brush $l$, which sweeps the resistances $o$ in the armature-circuit O, and also the contacts $O'$ $O^2$, the former of which is in the armature-circuit and connects to line, and the latter of which is in a closed armature-circuit. When the speed is normal, the current passes from M, through the armature, through circuit O, resistances $o$, contact $O'$, and circuit O to line. Any slight variations in speed are governed by the governor increasing or decreasing the resistance $o$ in the armature-circuit. If now the speed should continue to increase, due, say, to a steep decline and heavy load, the governor will continue to move the contact-brush $l$, and it will leave contact $O'$ and pass onto contact $O^2$, which is in circuit with the other end of the armature-circuit by wire $o'$. The armature is now out of the line-circuit and coupled up in a local circuit with the resistances $o$, which increases with the speed. The motor has now become a generator or dynamo-electric machine and the resistance to the rotation of the armature is utilized as a brake, the motor has practically disappeared, and the braking-dynamo been substituted in its stead. The current generated in the armature is expended in overcoming the resistances $o$, which are increased or decreased according as the speed of the train increases or decreases. If the speed still increases, (which could only occur in exceptional cases or where there was derangement of some of the working parts of the motor,) the governor will close the armature-circuit through the danger-signal lamp P, which, while it acts as an additional resistance, is a signal at night to indicate the enormous speed at which the train is traveling, and when its movement could not be perceived. This display of a danger-signal when the train is a long distance off will give ample time to operate a switch or turn-out or provide suitable means to arrest its movement and prevent excessive damage. This signal-light would naturally be a red light, but might be of any color desired, and is preferably of the large incandescent type. One other office of the governor is to close a branch circuit $O^3$, including the helix $O^4$, surrounding the lower part of the traction or drive-wheel I, to magnetize and cause it to attract the cable A and form a greater traction effect. This would come into play only on starting or when the train was running slowly, as in mounting heavy grades.

A switch Z, of any suitable construction, may be used to cut the armature out of circuit when the motor is at rest, and when so cut out the line-current passes through circuit O³ and coil O⁴ to line, so as not to materially vary the line-resistance.

R is a buffer carried by the frame H, and is supported at the rear by springs r. If the car runs into anything, the first concussion is received by the buffer. The backward movement of the buffer is utilized to shift the commutator, to bring the part k under the brushes K', to reverse the motor, and also to couple up the armature into a motor-circuit again. This result is accomplished by a lever R', which connects with the commutator, and a slotted link R², which connects the lever R' with the buffer R. As the buffer is forced back the lever R' is oscillated, shifting the commutator and closing the armature-circuit to line by wire O⁵ and circuit-closer O⁶. (See Fig. 4.) The instant the lever R' is shifted it is locked by spring-lock r', and the buffer may remain locked against return, or it may be allowed to return, compressing the small spring R³ in the link R². The motor is now reversed, and the train travels backward away from the danger; but the instant the armature is reversed the screw j thereon screws into the nut Q, pressed against it by light spring g, and causes said nut to trvael and break the contact Q', which ruptures the line-circuit M through the field-magnet and stops the motor and train.

The motor proper may be of the series, shunt, or compound shunt type, or any other form.

The switches C may be made to work upon a horizontal or vertical axis, as desired, or may be made in any suitable manner. In the form shown (see Fig. 3) it would be advisable to use a locking-weight c', which acts to retain the switch in either of its extreme positions until positively acted upon by the rollers or switch-cams g. In place of cables A, the rails may be made of bars, rods, or beams, elevated or upon the surface, or any or all of these may be combined to suit requirements in particular cases.

It is very evident that the details of construction may be changed and modified in various ways without departing from the invention. Therefore I do not in any wise limit myself to the particular construction shown.

In this invention it is apparent that the working-conductor is in sections, and such sections are arranged end to end, and the motor receives current from two of said sections at one time and is connected in series with such sections, and, furthermore, the current flows from one section through the motor or motors on the train to the next section.

Having now described my invention, what I claim as new, and desire to secure by Letters Patent, is—

1. In an electric-railway system, a series of working-conductor sections, in combination with positive and negative line-conductors, switches normally connecting said working-conductor sections with one of the line-conductors, a traveling train or vehicle, an electromotor carried by said train or vehicle and receiving electricity from said working-conductor sections, and means controlled by the passing train to actuate said switches in succession to connect the working-conductor sections successively with the line-conductor of the other polarity, whereby the trains or motors are connected in series through the divided or sectional working-conductors, substantially as and for the purpose specified.

2. In an electric-railway system, a series of working-conductor sections, in combination with positive and negative line-conductors, switches normally connecting said working-conductor sections with one of the line-conductors, a traveling train or vehicle, an electromotor carried by said train or vehicle and receiving electricity from said working-conductor sections, and means controlled by the passing train to actuate said switches in succession to connect the working-conductor sections successively with the line-conductor of the other polarity, and means to reset said switches upon the passage of the train or motor, whereby the trains or motors are connected in series through the divided or sectional working-conductor, substantially as and for the purpose specified.

3. In an electric-railway system, a divided or sectional working-conductor over which normally no current is passing, separate continuous line-conductors, and switches to connect said sections of working-conductors with either line-conductor, substantially as and for the purpose specified.

4. In an electric-railway system, a divided or sectional working-conductor over which normally no current is passing, separate continuous line-conductors, a train or vehicle, a motor carried thereby and receiving electric current from said working-conductors, and switches actuated by the passage of the train to connect said working-conductor sections successively in circuit with each of said line-circuits, whereby the motor is connected in series with the working-conductor sections, substantially as and for the purpose specified.

5. The combination of a working-conductor divided into sections, switches which normally bridge from one section to the other through a line-circuit, a continuous line-circuit to supply electricity to said working-conductor sections, a train or vehicle, an electric motor on the train or vehicle and receiving electricity from two of said sections of working-conductor, and means controlled by the passing train or vehicle for actuating said switches, whereby the said motor is connected in series with said divided working-conductor, substantially as and for the purpose specified.

6. The combination of a traveling vehicle, an electric motor to propel the vehicle carried thereon, having its armature and field-magnets both formed with helices, a movable commutator for reversing the current flowing through the armature-helices, and means for shifting the commutator longitudinally upon the motor-shaft, substantially as and for the purpose specified.

7. The combination of a traveling vehicle, an electric motor to propel the vehicle carried thereon and having its armature and field-magnets both formed with helices, a double commutator having corresponding sections connected to the same parts of the coils of the armature, said sections being set at different angles for reversing the current flowing through the armature-coils, the commutator and its brushes being movable relatively to each other in a direction parallel with and upon the motor-shaft, and automatic devices for shifting the commutator to reverse the motor in case of danger.

8. The combination of a traveling vehicle, an electric motor on said vehicle to propel the same and having its armature and field-magnets both formed with helices, a bared working-conductor arranged in the path of the vehicle, a collector carried by the vehicle and making contact with the conductor, a motor-circuit, a commutator K for said motor having part k, constructed for reversing the current in the armature-coils, and means to shift said commutator and brushes relative to each other, whereby the motor is reversed while running.

9. The combination, with the conductor-sections insulated from each other, of a traveling motor receiving electricity from said conductor, a pivoted switch C, to connect said sections together, and a weight c, carried by said switch and adapted to swing to either side of the fulcrum of the switch in opening and closing the same, and thereby be able to act under the influence of gravity to hold the switch in its two extreme positions.

10. In the herein-described system of telpherage, the combination of a conductor divided into sections, switches for causing the current to flow from one section through the motor to the next section, traveling trains or vehicles, one or more electric motors on the trains or vehicles by which they are driven, and devices operated by the trains or vehicles to move said switches successively and divert the current through the motors on said trains or vehicles, so that the motors are connected in series through the divided conductor, and a movable-weight device to assist in the movement of the switch and then retain it in the position assumed, substantially as and for the purpose specified.

11. The combination of working-conductor sections from which electric current is supplied to the motors on the train or car, a train or car having two collectors for making electrical connection with two separate sections at the same time, supply-conductors for supplying current to the several sections of working-conductor, a train or car supporting or moving said collectors, and an electric motor on said train or car to move it, whereby said motor is in series connection with said conductor-sections.

12. The combination of working-conductor sections from which electric current is supplied to the motors on the train or car, a train or car having two collectors for making electrical connection with two separate sections at the same time, supply-conductors for supplying current to the several sections of working-conductor, consisting of wheels which support part of the train or car, a train or car supporting or moving said collectors, and an electric motor on said train or car to move it, whereby said motor is in series connection with said conductor-sections.

13. The combination of conductor-sections from which electric current is supplied to the motor on the train or car, a train or car having two collectors for making electrical connection with two separate sections at the same time, a train or car supporting or moving said collectors, an electric motor on said train or car to move it, whereby said motor is in series connection with said conductor-sections, positive and negative line-conductors, a source of electric supply, and switches controlled by the movement of the train or car to couple said conductor-sections with the line-conductors.

14. A working-conductor over which normally no current is passing, a car or train, an electric motor to propel said car or train and receiving electricity from said working-conductor, a line-conductor, a source of electric supply, and switch-connections between said working-conductor and line-conductor at intervals apart and controlled by the movement of the train or car to connect or disconnect the working-conductor with the line.

15. A suspended working-conductor, a current-collecting device carried by said conductor, an electrically-propelled train or car receiving current from said collecting device, a line-conductor, a source of electric supply, and connections between said line-conductor and working-conductor at intervals apart.

16. A suspended working-conductor divided into sections, a current-collecting device carried by said conductor, an electrically-propelled train or car receiving current from said collecting device, a line-conductor, a source of electric supply, and connections between said line-conductor and working-conductor at intervals apart, and switches in the connections between the line and working conductors.

17. Two suspended working-conductor sections respectively adapted to supply currents of different polarity to a current-collecting device at one time, a current-collecting device carried by said conductor-sections and in electrical connection with both of them, an electrically-propelled train or car receiving current from said collecting device, a line-conductor, and switches automatically controlled by the collecting devices to connect or disconnect the conductor-sections with the line-conductors.

18. In an electric railway, a working-conductor over which normally no current is flowing, a line-conductor, a source of electric supply, and switches for connecting the working-conductor with the line-conductor and controlled by the electrically-propelled train or car during its passage, in combination with said electrically-propelled train or car receiving electricity from said working-conductor.

19. The combination of two insulated working-conductor sections, a movable switch for connecting or disconnecting them, and a weight to hold said switch in its two extreme positions, substantially as and for the purpose specified.

20. The switch C, having the double inclined cam-faces c, pointing in opposite directions from its fulcrum-point, an electric circuit controlled by said switch, and a traveling vehicle having roller or equivalent projections to work upon said cam-faces of the switch to shift it.

In testimony of which invention I hereunto set my hand.

RUDOLPH M. HUNTER.

Witnesses:
RICHD. S. CHILD, Jr.,
ERNEST HOWARD HUNTER.